United States Patent
Mori et al.

(10) Patent No.: US 11,967,467 B2
(45) Date of Patent: Apr. 23, 2024

(54) MULTI-LAYER CERAMIC ELECTRONIC COMPONENT AND CIRCUIT BOARD INCLUDING THE SAME

(71) Applicant: TAIYO YUDEN CO., LTD., Tokyo (JP)

(72) Inventors: Fumi Mori, Takasaki (JP); Daisuke Iwai, Takasaki (JP); Shinichi Sasaki, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 52 days.

(21) Appl. No.: 17/894,535

(22) Filed: Aug. 24, 2022

(65) Prior Publication Data

US 2023/0086815 A1  Mar. 23, 2023

(30) Foreign Application Priority Data

Sep. 17, 2021 (JP) .................. 2021-152358

(51) Int. Cl.
*H01G 4/30* (2006.01)
*H01G 2/06* (2006.01)
*H01G 4/008* (2006.01)
*H01G 4/012* (2006.01)

(52) U.S. Cl.
CPC .............. *H01G 4/30* (2013.01); *H01G 2/065* (2013.01); *H01G 4/008* (2013.01); *H01G 4/012* (2013.01)

(58) Field of Classification Search
CPC .......... H01G 2/065; H01G 4/008; H01G 4/12; H01G 4/30
See application file for complete search history.

(56) References Cited

U.S. PATENT DOCUMENTS

| | | | |
|---|---|---|---|
| 2015/0279568 A1 | 10/2015 | Saito et al. | |
| 2016/0086733 A1* | 3/2016 | Saito | H01G 4/1227 205/183 |
| 2018/0174752 A1 | 6/2018 | Yanagisawa et al. | |
| 2019/0318876 A1* | 10/2019 | Matsushita | H01G 4/012 |
| 2021/0366657 A1* | 11/2021 | Sakai | H01G 4/012 |
| 2023/0207206 A1* | 6/2023 | Jung | H01G 4/30 361/301.4 |

FOREIGN PATENT DOCUMENTS

| | | |
|---|---|---|
| JP | S6480011 A | 3/1989 |
| JP | 2015188046 A | 10/2015 |
| JP | 2018101751 A | 6/2018 |

* cited by examiner

*Primary Examiner* — Nathan Milakovich
(74) *Attorney, Agent, or Firm* — Law Office of Katsuhiro Arai

(57) ABSTRACT

A multi-layer ceramic electronic component includes a ceramic body and an external electrode. The ceramic body includes a plurality of internal electrodes laminated in one axial direction, and an end surface extending along a plane parallel to the axial direction, at least part of the plurality of internal electrode being drawn from the end surface. The external electrode covers the end surface of the ceramic body. In a thermal desorption spectrum of water of the multi-layer ceramic electronic component by thermal desorption spectroscopy, a ratio P1/P2 of a detection intensity P1 of a first peak in a range of 200° C. to 300° C. to a detection intensity P2 of a second peak in a range of 550° C. to 800° C. is equal to or lower than 11.

8 Claims, 4 Drawing Sheets

MULTI-LAYER CERAMIC ELECTRONIC COMPONENT AND CIRCUIT BOARD INCLUDING THE SAME

BACKGROUND ART

The present disclosure relates to a multi-layer ceramic electronic component including an external electrode.

Multi-layer ceramic capacitors are likely to cause failures such as a reduction in insulation resistance (IR) due to the diffusion of hydrogen into ceramic bodies. Such diffusion of hydrogen into a ceramic body is likely to occur, for example, when the hydrogen generated in a wet plating step for forming external electrodes is occluded and left in the external electrodes.

To cope with the diffusion of hydrogen, Japanese Patent Application Laid-open No. HEI 01-080011 discloses the technology of making it difficult to diffuse the hydrogen in the external electrodes to the ceramic body. In this technology, metal having the effect of suppressing the absorption of hydrogen is added to internal electrodes, so that the hydrogen in the external electrodes can be suppressed from being diffused to the ceramic body in a pathway along the internal electrodes.

Further, Japanese Patent Application Laid-open No. 2018-101751 discloses the technology of preventing hydrogen from intruding into the ceramic body from the external electrodes. In the technology, Mo having the effect of inhibiting hydrogen from passing through the base layer of the external electrode is added. This configuration can hinder the intrusion of hydrogen, which is generated when a plating layer is formed on the base layer, into the ceramic body.

Additionally, Japanese Patent Application Laid-open No. 2015-188046 discloses the technology of suppressing the generation of hydrogen due to electrolysis of moisture intruding through the external electrodes. In this technology, the external electrodes are formed to be thick at the anode end in which electrolysis occurs. This inhibits moisture from intruding through the external electrodes at the anode end, so that the generation of hydrogen due to the electrolysis can be suppressed.

SUMMARY OF THE INVENTION

In the multi-layer ceramic capacitor, as the thickness of ceramics, which insulates the electrodes having different polarities from each other, becomes smaller along with downsizing, an insulation resistance (IR) is also likely to be reduced due to smaller influence of hydrogen. Thus, there is a need for a multi-layer ceramic capacitor having a configuration capable of more reliably suppressing a reduction in insulation resistance (IR) due to the influence of hydrogen.

In view of the circumstances as described above, it is desirable to provide a multi-layer ceramic electronic component that is hardly affected by hydrogen.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, according to one embodiment of the present disclosure, there is provided a multi-layer ceramic electronic component including a ceramic body and an external electrode.

The ceramic body includes a plurality of internal electrodes laminated in one axial direction, and an end surface extending along a plane parallel to the axial direction, at least part of the plurality of internal electrode being drawn from the end surface.

The external electrode covers the end surface of the ceramic body.

In a thermal desorption spectrum of water of the multi-layer ceramic electronic component by thermal desorption spectroscopy (TDS), a ratio P1/P2 of a detection intensity P1 of a first peak in a range of 200° C. to 300° C. to a detection intensity P2 of a second peak in a range of 550° C. to 800° C. is equal to or lower than 11.

The multi-layer ceramic electronic component is designed such that the detection intensity P1 of the first peak and the detection intensity P2 of the second peak in the thermal desorption spectrum of water by TDS satisfy the above condition, so that a configuration hardly affected by hydrogen can be achieved.

The multi-layer ceramic electronic component may have a size equal to or smaller than 0.4±0.02 mm×0.2±0.02 mm×0.2±0.02 mm.

The multi-layer ceramic electronic component may have a size equal to or smaller than 0.25±0.013 mm×0.125±0.013 mm×0.125±0.013 mm.

The external electrode may include at least a single-layer plating layer.

The external electrode may include an internal layer portion mainly containing Ni, and an external layer portion having a three-layer structure including a Cu layer, a Ni layer, and a Sn layer in sequence from inside.

The external electrode may include an internal layer portion mainly containing Cu, and an external layer portion having a double-layer structure including a Ni layer and a Sn layer in sequence from inside.

The multi-layer ceramic electronic component may be a multi-layer ceramic capacitor.

According to another embodiment of the present disclosure, there is provided a circuit board including: the multi-layer ceramic electronic component described above; and a mounting substrate including a connection electrode connected to the external electrode of the multi-layer ceramic electronic component via solder.

It is possible to provide a multi-layer ceramic electronic component that is hardly affected by hydrogen.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, an embodiment of the present disclosure will be described with reference to the drawings.

In the figures, the X-axis, the Y-axis, and the Z-axis orthogonal to one another are shown as appropriate. The X-axis, the Y-axis, and the Z-axis are common in all figures.

1. Basic Configuration of Multi-Layer Ceramic Capacitor 10

Figure 1:
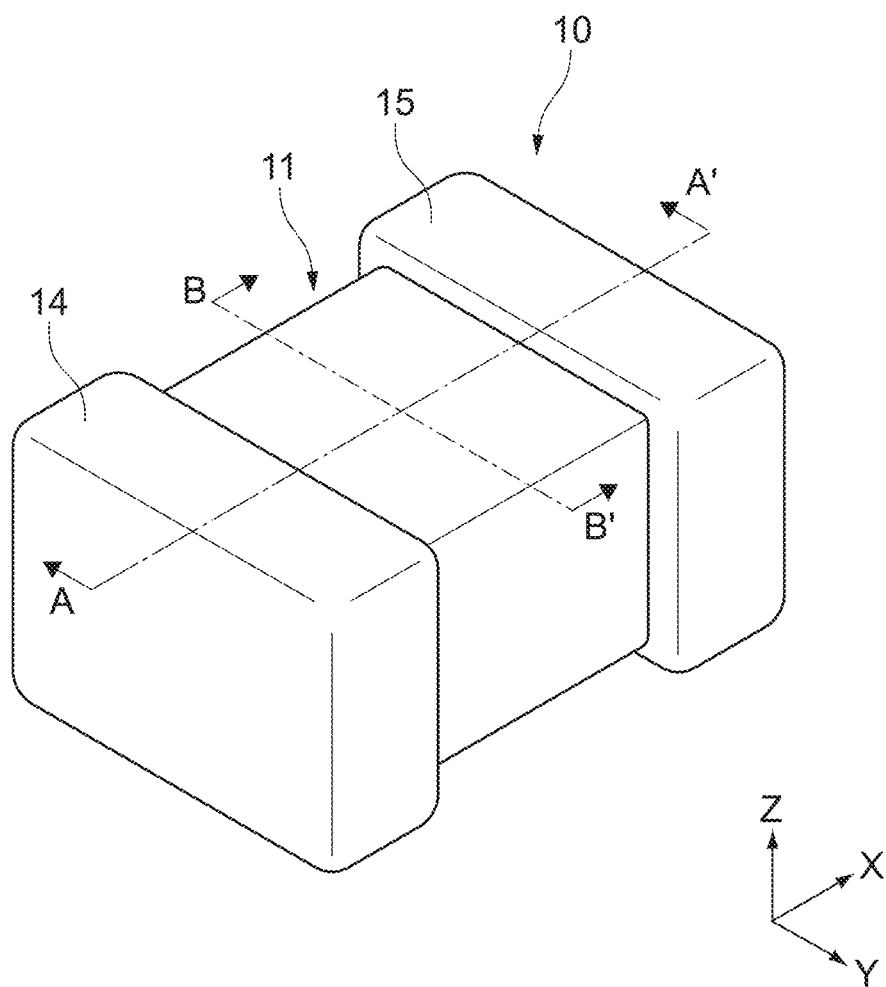
FIG. 1 is a perspective view of a multi-layer ceramic capacitor according to an embodiment of the present disclosure.
Figure 2:
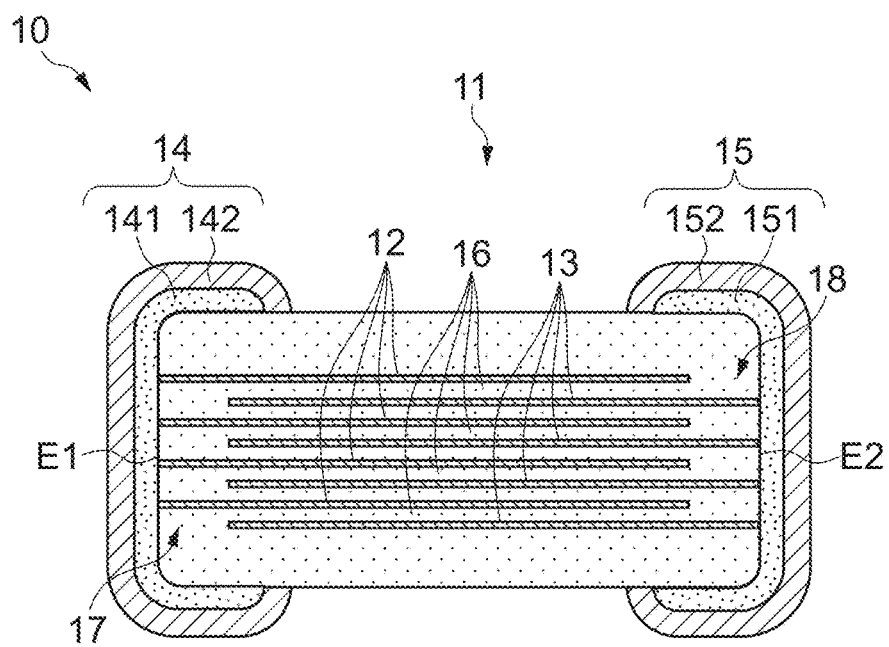
FIG. 2 is a cross-sectional view of the multi-layer ceramic capacitor taken along the line A-A' of FIG. 1.
Figure 2:
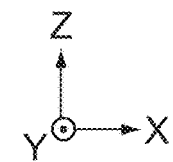
Figure 3:
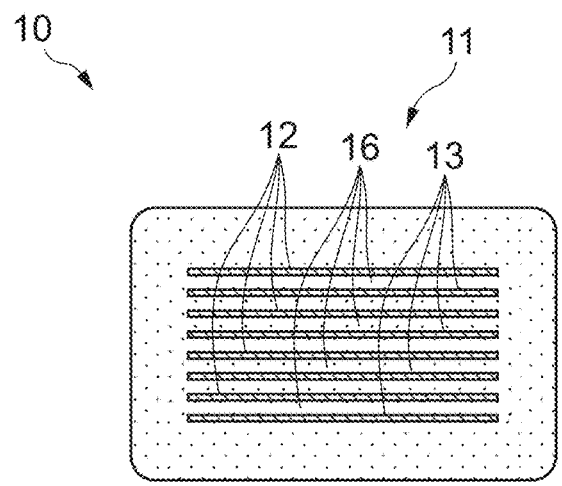
FIG. 3 is a cross-sectional view of the multi-layer ceramic capacitor taken along the line B-B' of FIG. 1.
Figure 3:
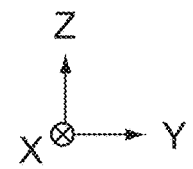

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the line A-A' of FIG. 1. FIG. 3 is a cross-sectional view of the multi-layer ceramic capacitor 10 taken along the line B-B' of FIG. 1.

The multi-layer ceramic capacitor 10 includes a ceramic body 11, a first external electrode 14, and a second external electrode 15. The outer surface of the ceramic body 11 includes first and second end surfaces E1 and E2 extending parallel to the Y-Z plane, first and second side surfaces extending parallel to the X-Z plane, and first and second main surfaces extending parallel to the X-Y plane.

The first and second end surfaces E1 and E2, the side surfaces, and the main surfaces of the ceramic body 11 are each formed as a flat surface. The flat surface according to this embodiment does not need to be strictly flat if the surface may be recognized as being flat when viewed as a whole. For example, the flat surface according to this embodiment also includes a surface having fine irregularities thereon, a surface having a gently curved shape in a predetermined range, and the like.

The first and second external electrodes 14 and 15 cover the first and second end surfaces E1 and E2 of the ceramic body 11, respectively, and face each other in the X-axis direction with the ceramic body 11 interposed therebetween. The first and second external electrodes 14 and 15 extend from the first and second end surfaces E1 and E2 to the main surfaces and side surfaces of the ceramic body 11. With this configuration, the first and second external electrodes 14 and 15 have U-shaped cross-sections parallel to the X-Z plane and parallel to the X-Y plane.

Note that the shape of the first and second external electrodes 14 and 15 is not limited to that shown in FIG. 1. For example, the first and second external electrodes 14 and 15 may respectively extend from the first and second end surfaces E1 and E2 of the ceramic body 11 to one of the main surfaces to have an L-shaped cross-section parallel to the X-Z plane. Alternatively, the first and second external electrodes 14 and 15 need not extend to any one of the main surfaces and side surfaces.

The first external electrode 14 includes an internal layer portion 141 and an external layer portion 142. The internal layer portion 141 is adjacent to the first end surface E1 of the ceramic body 11 and forms the most internal layer of the first external electrode 14. The external layer portion 142 covers the first end surface E1 of the ceramic body 11 through the internal layer portion 141 and forms the most external layer of the first external electrode 14.

The second external electrode 15 includes an internal layer portion 151 and an external layer portion 152. The internal layer portion 151 is adjacent to the second end surface E2 of the ceramic body 11 and forms the most internal layer of the second external electrode 15. The external layer portion 152 covers the second end surface E2 of the ceramic body 11 through the internal layer portion 151 and forms the most external layer of the second external electrode 15.

The material of the internal layer portions 141 and 151 of the first and second external electrodes 14 and 15 only needs to be a good conductor of electricity. Examples of the material include a metal mainly containing at least one element of copper (Cu), nickel (Ni), palladium (Pd), or silver (Ag), and an alloy thereof. Note that the main component according to this embodiment means a component having the highest content ratio.

Each of the internal layer portions 141 and 151 can be formed as, for example, at least a single-layer baked film obtained by baking a conductive metal paste, or at least a single-layer sputtering film formed by sputtering. Further, each of the internal layer portions 141 and 151 may be formed from a combination of a baked film and a sputtering film.

The material of the external layer portions 142 and 152 of the first and second external electrodes 14 and 15 only needs to be a good conductor of electricity. Examples of the material include a metal mainly containing at least one element of Ni, Cu, tin (Sn), Pd, or Ag, and an alloy thereof. Each of the external layer portions 142 and 152 can be formed as, for example, at least a single-layer plating layer formed by a wet plating method.

The ceramic body 11 is formed of dielectric ceramics. The ceramic body 11 includes a plurality of first internal electrodes 12 and a plurality of second internal electrodes 13 that are covered with dielectric ceramics. The first and second internal electrodes 12 and 13 each have a sheet-like shape extending along the X-Y plane and are alternately disposed along the Z-axis direction.

In other words, the ceramic body 11 includes an opposing region in which the first and second internal electrodes 12 and 13 are opposed to each other in the Z-axis direction with ceramic layers 16 interposed therebetween. The first internal electrodes 12 are drawn to the first end surface E1 from the opposing region and connected to the first external electrode 14. The second internal electrodes 13 are drawn to the second end surface E2 from the opposing region and connected to the second external electrode 15.

The ceramic body 11 includes a first end margin 17 and a second end margin 18. The first end margin 17 insulates the first external electrode 14 and the second internal electrodes 13 from each other. The second end margin 18 insulates the second external electrode 15 and the first internal electrodes 12 from each other.

With the configuration described above, when a voltage is applied between the first external electrode 14 and the second external electrode 15 in the multi-layer ceramic capacitor 10, the voltage is applied to the ceramic layers in the opposing region including the first and second internal electrodes 12 and 13. Thus, the multi-layer ceramic capacitor 10 stores charge corresponding to the voltage applied between the first external electrode 14 and the second external electrode 15.

In the ceramic body 11, in order to increase a capacitance of each ceramic layer provided between the first and second internal electrodes 12 and 13, dielectric ceramics having a high dielectric constant is used. Examples of the dielectric ceramics having a high dielectric constant include a material having a perovskite structure containing barium (Ba) and titanium (Ti), which is typified by barium titanate ($BaTiO_3$).

Note that the dielectric ceramics may have a composition system of strontium titanate ($SrTiO_3$), calcium titanate ($CaTiO_3$), magnesium titanate ($MgTiO_3$), calcium zirconate ($CaZrO_3$), calcium zirconate titanate ($Ca(Zr, Ti)O_3$), barium calcium zirconate titanate ($(Ba, Ca)(Zr, Ti)O_3$), barium zirconate ($BaZrO_3$), titanium oxide ($TiO_2$), or the like.

2. Configuration for Suppressing Influence of Hydrogen

In the multi-layer ceramic capacitor 10, the ceramic layers 16 and the first and second end margins 17 and 18, which insulate the electrodes having different polarities in the ceramic body 11 from each other, are deteriorated due to the influence of hydrogen, thus reducing an insulation resistance (IR). The form of hydrogen that may affect the ceramic body 11 includes a hydrogen atom, a hydrogen ion, a hydrogen isotope, and the like.

The inventors of the present application have found a condition that the multi-layer ceramic capacitor 10 is made less susceptible to hydrogen. In other words, the multi-layer ceramic capacitor 10 according to this embodiment is designed to satisfy the condition found in the present invention, thus achieving a configuration in which a reduction in insulation resistance (IR) due to the influence of hydrogen is less likely to occur.

More specifically, the inventors of the present application have found that, particularly in a downsized configuration, the magnitude of the influence of hydrogen actually exerted on the multi-layer ceramic capacitor 10 is apt to be reflected in the desorption behavior of water rather than the desorption behavior of hydrogen itself. Hence, in this embodiment, the difficulty of being affected by hydrogen is determined with reference to the desorption behavior of water.

Specifically, in this embodiment, in order to understand the desorption behavior of water in the multi-layer ceramic capacitor 10, a thermal desorption spectrum of water by thermal desorption spectroscopy (TDS) is used. Examples of a TDS device to be used include TDS-1200II manufactured by ESCO, Ltd.

In TDS, the detection intensity of water desorbed from the multi-layer ceramic capacitor 10 is measured in the process of increasing the temperature to a predetermined upper limit temperature with a constant rate of temperature increase. The upper limit temperature is favorably set to 800° C. or higher. Further, in TDS, a plurality of multi-layer ceramic capacitors 10 having a similar configuration are collectively analyzed, so that the detection accuracy can be enhanced.

Figure 4:
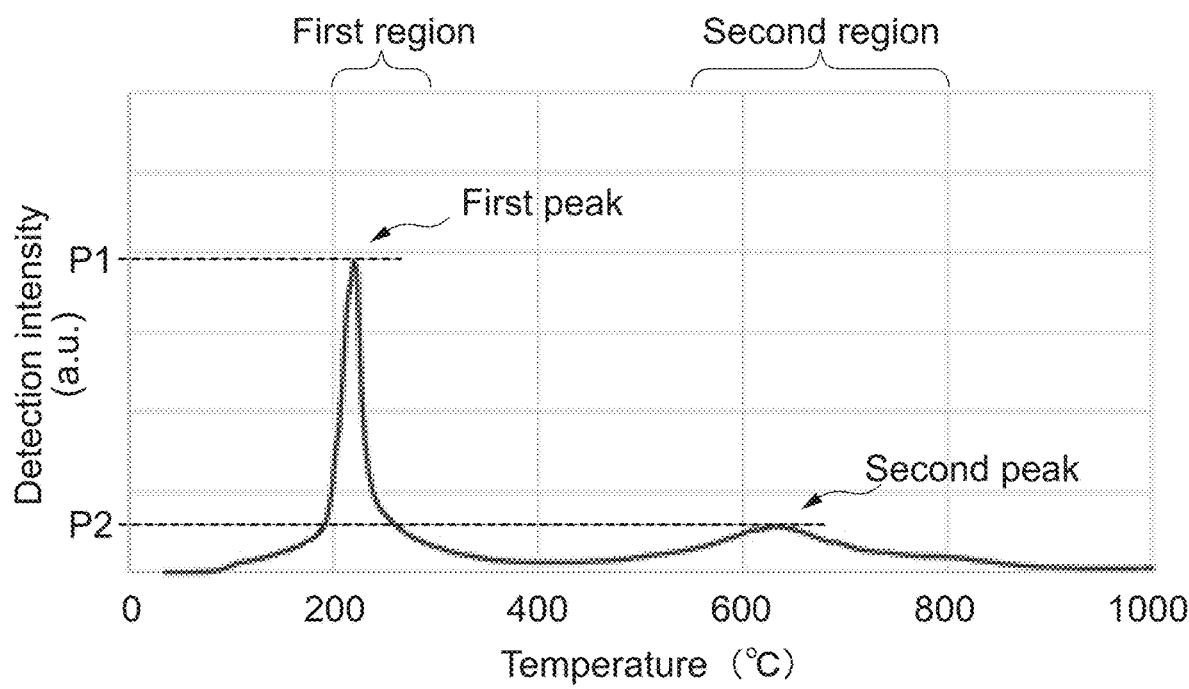
FIG. 4 is a diagram showing an example of a thermal desorption spectrum of water by thermal desorption spectroscopy (TDS)

FIG. 4 is a diagram showing an example of a thermal desorption spectrum of water obtained as the results of TDS. In this thermal desorption spectrum, the horizontal axis represents the temperature, and the vertical axis represents the detection intensity of water (any unit (a.u.)). In this thermal desorption spectrum, it is found that the amount of water desorbed from the multi-layer ceramic capacitor 10 is relatively large at a temperature having a large detection intensity.

FIG. 4 shows a first region showing a temperature range of 200° C. to 300° C. and a second region showing a temperature range of 550° C. to 800° C. In the thermal desorption spectrum of water, generally, the first region and the second region each have one peak. The peak in the first region is referred to as a first peak, and the peak in the second region is referred to as a second peak.

Further, FIG. 4 shows a detection intensity P1 of the first peak and a detection intensity P2 of the second peak. The detection intensity P1 is a detection intensity at a peak top of the first peak and is a detection intensity that is maximum in the first region. The detection intensity P2 is a detection intensity at a peak top of the second peak and is a detection intensity that is maximum in the second region. As shown in FIG. 4, the detection intensities P1 and P2 can take the measured values as they are, as values relative to the detection intensity 0.

In the multi-layer ceramic capacitor 10, water molecules are present mainly in two types of states, i.e., in an adsorption state of being adsorbed on the surface, and a bonding state of being chemically bonded to the molecules constituting the crystal. In the multi-layer ceramic capacitor 10, the water molecules in the adsorption state having a relatively low holding strength are desorbed at around 250° C., and the water molecules in the bonding state having a relatively high holding strength are desorbed at around 650° C.

In the thermal desorption spectrum of water of the multi-layer ceramic capacitor 10, the first peak is derived from the desorption of the water molecules in the adsorption state, and the second peak is derived from the desorption of the water molecules in the bonding state. Therefore, in the multi-layer ceramic capacitor 10, it is found that as the ratio P1/P2 of the detection intensity P1 to the detection intensity P2 becomes larger, the ratio of the water molecules in the adsorption state becomes larger.

In the thermal desorption spectrum of water of the multi-layer ceramic capacitor 10, generally, the first detection intensity P1 tends to be larger than the second detection intensity P2 to a large extent. In contrast, in this embodiment, the ratio P1/P2 is kept equal to or lower than 11 in the multi-layer ceramic capacitor 10, so that the configuration hardly affected by the hydrogen can be achieved.

In other words, the multi-layer ceramic capacitor 10 is designed to reduce the amount of water molecules in the adsorption state, so that the configuration hardly affected by the hydrogen can be achieved. In order to reduce the amount of water molecules in the adsorption state in the multi-layer ceramic capacitor 10, various known methods can be used, and a plurality of known methods can also be used in combination.

By way of example, in the multi-layer ceramic capacitor 10, the among of water molecules in the adsorption state can be reduced by heat treatment. In other words, the multi-layer ceramic capacitor 10 according to this embodiment can be hardly affected by the hydrogen through heat treatment in which various conditions such as a temperature profile and an atmosphere are optimized to set the ratio P1/P2 to 11 or less.

Further, in the multi-layer ceramic capacitor 10, if the external layer portions 142 and 152 of the first and second external electrodes 14 and 15 are each formed as at least a single-layer plating layer, the ratio P1/P2 is likely to increase in the process of wet plating. Hence, in order to keep the ratio P1/P2 low, it is effective to suppress the increase of the ratio P1/P2 in the process of wet plating.

In contrast, in this embodiment, the deposition speed of the material in wet plating is lowered. This makes it possible to suppress the adsorption of the water molecules and to keep the ratio P1/P2 low. It is not favorable to excessively lower the deposition speed of the material in wet plating from the viewpoint of ensuring the continuity of the plating layer.

The deposition speed of the material in wet plating can be controlled by, for example, a current value, the temperature of a plating solution, or an ion concentration of a plating solution. Specifically, the deposition speed of the material in wet plating can be lowered by lowering the current value, the temperature of the plating solution, or the ion concentration of the plating solution, and can be contrarily increased by increasing the current value, the temperature of the plating solution, or the ion concentration of the plating solution.

If each of the external layer portions 142 and 152 has a multi-layer structure including a plurality of plating layers, the condition of wet plating can be determined for each of the plurality of plating layers. In this case, in order to reduce the ratio P1/P2, it is most effective to lower the deposition speed of the material in wet plating for forming the innermost plating layer adjacent to each of the internal layer portions 141 and 151.

For example, if each of the external layer portions 142 and 152 has a three-layer structure including a Cu layer, a Ni layer, and a Sn layer in sequence from inside, the deposition speed of Cu in Cu plating is lowered. In order to lower the deposition speed of Cu in Cu plating, for example, it is effective to reduce the current value. The current value in Cu plating can be set to, for example, the range of 10 to 30 A. If the external layer portions 142 and 152 each have the three-layer structure including a Cu layer, a Ni layer, and a Sn layer as described above, it is favorable that the main component of the internal layer portions 141 and 151 is Ni.

Further, if each of the external layer portions 142 and 152 has a double-layer structure including a Ni layer and a Sn layer in sequence from inside, the deposition speed of Ni in Ni plating is lowered. In order to lower the deposition speed of Ni in Ni plating, for example, it is effective to reduce at least one of the temperature or ion concentration of a plating solution. If the external layer portions 142 and 152 each have the double-layer structure including a Ni layer and a Sn layer as described above, it is favorable that the main component of the internal layer portions 141 and 151 is Cu.

The design technique using the thermal desorption spectrum of water according to this embodiment is particularly effective in a small multi-layer ceramic capacitor 10 in which the magnitude of the influence of hydrogen is less likely to be reflected in the desorption behavior of hydrogen. Specifically, the multi-layer ceramic capacitor 10 favorably has the size equal to or smaller than 0.4±0.02 mm×0.2±0.02 mm×0.2±0.02 mm, and more favorably the size equal to or smaller than 0.25±0.013 mm×0.125±0.013 mm×0.125±0.013 mm.

3. Examples and Comparative Examples

Examples and Comparative examples of the embodiment described above will be described. In Examples 1 to 4, the samples of the multi-layer ceramic capacitor 10 were produced on the condition that the ratio P1/P2 is 11 or less. Further, in Comparative examples 1 and 2, the samples of the multi-layer ceramic capacitor 10 were produced on the condition that the ratio P1/P2 exceeds 11.

In each of Examples 1 to 4 and Comparative examples 1 and 2, the size of the samples of the multi-layer ceramic capacitor 10 was set to 0.4 mm×0.2 mm×0.2 mm. Further, in Examples 1 to 4 and Comparative examples 1 and 2, the configuration of the samples of the multi-layer ceramic capacitor 10 except for the ratio P1/P2 was set to be substantially the same.

In each of Examples 1 to 4 and Comparative examples 1 and 2, 5000 samples were used to perform TDS. As the condition of TDS, the rate of temperature increase was set to 60° C./min, the upper limit temperature was set to 1030° C., and the sampling period was set to 3.5° C. Thus, the thermal desorption spectrum of water was obtained for each of Examples 1 to 4 and Comparative examples 1 and 2.

Figure 5:
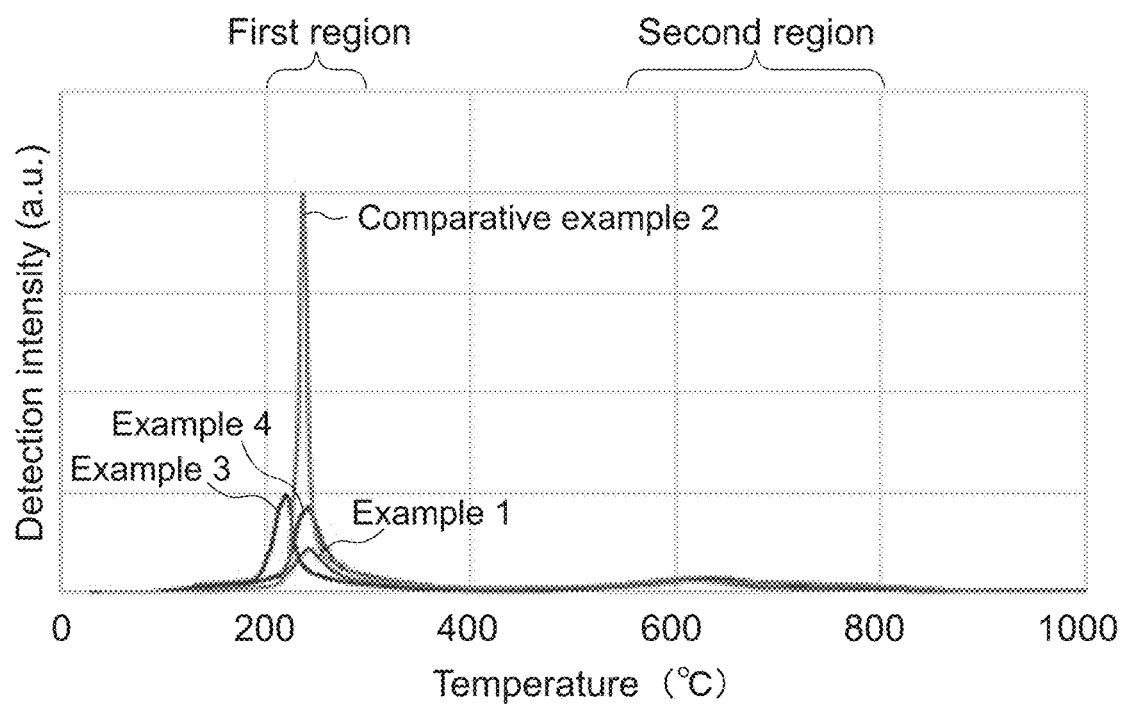
FIG. 5 is a diagram showing a thermal desorption spectrum of water by TDS in each of Examples and Comparison examples.

Just for reference, FIG. 5 shows a thermal desorption spectrum of water in each of Examples 1, 3, and 4 and Comparative example 2. The detection intensities P1 and P2 were obtained on the basis of the thermal desorption spectrum of water for each of Examples 1 to 4 and Comparative examples 1 and 2, and the ratio P1/P2 was calculated from the obtained detection intensities P1 and P2.

The samples according to each of Examples 1 to 4 and Comparative examples 1 and 2 were subjected to a moisture resistance load test. In the moisture resistance load test, the samples were held at a temperature of 85° C. and a humidity of 85% for 100 hours under application of a voltage of 10V. Subsequently, the insulation resistance (IR) of the samples subjected to the moisture resistance load test was measured. The samples having an insulation resistance (IR) of 100 MΩ or more were regarded as pass, and the samples having an insulation resistance (IR) less than 100 MΩ were regarded as fail.

TABLE 1

|  | P1/P2 | Moisture resistance load test |
| --- | --- | --- |
| Example 1 | 3.27 | Pass |
| Example 2 | 4.71 | Pass |
| Example 3 | 6.81 | Pass |
| Example 4 | 10.55 | Pass |
| Comparative example 1 | 11.52 | Fail |
| Comparative example 2 | 33.06 | Fail |

Table 1 shows the ratio P1/P2 and the results of the moisture resistance load test for each of Examples 1 to 4 and Comparative examples 1 and 2. As shown in Table 1, the samples of Examples 1 to 4 in which the ratio P1/P2 is 11 or less passed the moisture resistance load test. On the other hand, the samples of Comparative examples 1 and 2 in which the ratio P1/P2 exceeds 11 did not pass the moisture resistance load test.

Those results reveal that, in the samples according to Examples 1 to 4, the influence of hydrogen is suppressed and a large insulation resistance can be maintained after the moisture resistance load test. On the other hand, in the samples according to Comparative examples 1 and 2, the insulation resistance is greatly lowered due to the influence of hydrogen.

4. Circuit Board 100

Figure 6:
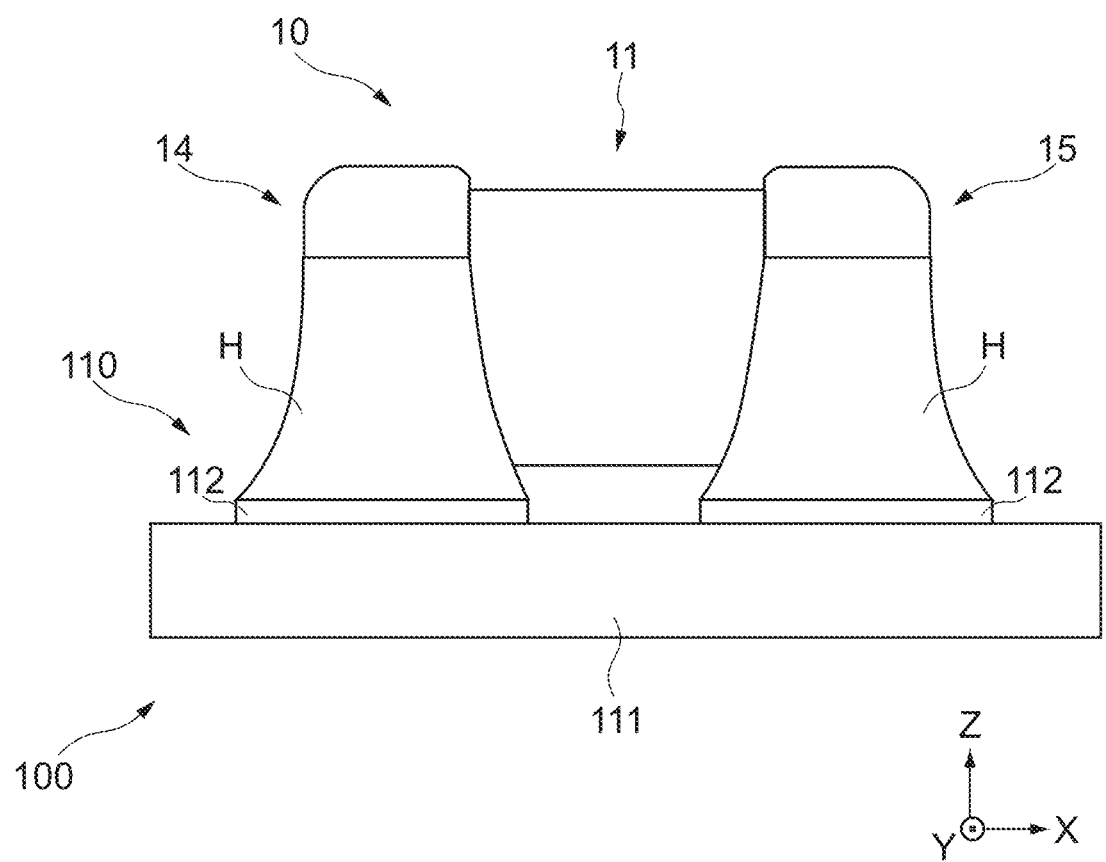
FIG. 6 is a side view of a circuit board including the multi-layer ceramic capacitor.

FIG. 6 is a side view of a circuit board 100 including the multi-layer ceramic capacitor 10. The circuit board 100 includes a mounting substrate 110 on which the multi-layer ceramic capacitor 10 is mounted using solder H. The mounting substrate 110 includes a substrate body 111 extending along the X-Y plane, and a pair of connection electrodes 112 provided on the substrate body 111.

In the circuit board 100, the first and second external electrodes 14 and 15 of the multi-layer ceramic capacitor 10 are connected to the pair of connection electrodes 112 of the mounting substrate 110 via the solder H. With this configuration, in the circuit board 100, the multi-layer ceramic capacitor 10 is fixed to the mounting substrate 110 and also electrically connected thereto.

5. Other Embodiments

While the embodiment of the present disclosure has been described, the present disclosure is not limited to the embodiment described above, and it should be appreciated that the present disclosure may be variously modified.

For example, the first and second external electrodes 14 and 15 of the multi-layer ceramic capacitor 10 according to this embodiment are not limited to the configuration described above. For example, the first and second external electrodes 14 and 15 need not include the internal layer portions 141 and 151 and the external layer portions 142 and 152 as described above and may have a single-layer configuration or may include three or more different types of configurations.

Further, the present disclosure is applicable not only to the multi-layer ceramic capacitors but also to any other multi-layer ceramic electronic components each having a laminated configuration of internal electrodes. Examples of such multi-layer ceramic electronic components to which the present disclosure is applicable include a chip varistor, a chip thermistor, and a multi-layer inductor, in addition to the multi-layer ceramic capacitors.

It will be apparent to those skilled in the art that various modifications and variations can be made in the present disclosure without departing from the spirit or scope of the disclosure. Thus, it is intended that the present disclosure cover modifications and variations that come within the scope of the appended claims and their equivalents. In particular, it is explicitly contemplated that any part or whole of any two or more of the embodiments and their modifications described above can be combined and regarded within the scope of the present disclosure.

What is claimed is:

1. A multi-layer ceramic electronic component, comprising:
   a ceramic body including
      a plurality of internal electrodes laminated in one axial direction, and
      an end surface extending along a plane parallel to the axial direction, at least part of the plurality of internal electrode being drawn from the end surface; and
   an external electrode that covers the end surface of the ceramic body, wherein
   in a thermal desorption spectrum of water of the multi-layer ceramic electronic component by thermal desorption spectroscopy, a ratio P1/P2 of a detection intensity P1 of a first peak in a range of 200° C. to 300° C. to a detection intensity P2 of a second peak in a range of 550° C. to 800° C. is equal to or lower than 11.

2. The multi-layer ceramic electronic component according to claim 1, which has a size equal to or smaller than 0.4±0.02 mm×0.2±0.02 mm×0.2±0.02 mm.

3. The multi-layer ceramic electronic component according to claim 1, which has a size equal to or smaller than 0.25±0.013 mm×0.125±0.013 mm×0.125±0.013 mm.

4. The multi-layer ceramic electronic component according to claim 1, wherein
   the external electrode includes at least a single-layer plating layer.

5. The multi-layer ceramic electronic component according to claim 1, wherein
   the external electrode includes
      an internal layer portion mainly containing Ni, and
      an external layer portion having a three-layer structure including a Cu layer, a Ni layer, and a Sn layer in sequence from inside.

6. The multi-layer ceramic electronic component according to claim 1, wherein
   the external electrode includes
      an internal layer portion mainly containing Cu, and
      an external layer portion having a double-layer structure including a Ni layer and a Sn layer in sequence from inside.

7. The multi-layer ceramic electronic component according to claim 1, which is a multi-layer ceramic capacitor.

8. A circuit board, comprising:
   the multi-layer ceramic electronic component according to claim 1; and
   a mounting substrate including a connection electrode connected to the external electrode of the multi-layer ceramic electronic component via solder.

* * * * *